(12) United States Patent
Qin et al.

(10) Patent No.: US 9,529,483 B2
(45) Date of Patent: Dec. 27, 2016

(54) DISPLAY SUBSTRATE AND MANUFACTURING METHOD THEREOF, TOUCH PANEL, AND DISPLAY DEVICE

(71) Applicant: BOE TECHNOLOGY GROUP CO., LTD., Beijing (CN)

(72) Inventors: Wei Qin, Beijing (CN); Jiayang Zhao, Beijing (CN); Xiangxiang Zou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/415,853

(22) PCT Filed: Apr. 18, 2014

(86) PCT No.: PCT/CN2014/075660
§ 371 (c)(1),
(2) Date: Jan. 20, 2015

(87) PCT Pub. No.: WO2015/089965
PCT Pub. Date: Jun. 25, 2015

(65) Prior Publication Data
US 2016/0026285 A1 Jan. 28, 2016

(30) Foreign Application Priority Data

Dec. 17, 2013 (CN) .......................... 2013 1 0694084

(51) Int. Cl.
G06F 3/044 (2006.01)
G06F 3/041 (2006.01)
(Continued)

(52) U.S. Cl.
CPC ........... *G06F 3/044* (2013.01); *G02F 1/13338* (2013.01); *G06F 3/041* (2013.01);
(Continued)

(58) Field of Classification Search
CPC G06F 3/041; G06F 3/044; G06F 2203/04103; G02F 1/13338; G02F 1/133509; G02F 2202/16
See application file for complete search history.

(56) References Cited

U.S. PATENT DOCUMENTS

2012/0081330 A1* 4/2012 Park ....................... G06F 3/0412
345/174
2013/0127776 A1* 5/2013 Guard ................... G06F 3/0412
345/174

(Continued)

FOREIGN PATENT DOCUMENTS

CN 101813843 A 8/2010
CN 102213852 A 10/2011

(Continued)

OTHER PUBLICATIONS

Li, Qingnian, "Practice Pandect of New Technique and New Application Technology on Designing, Manufacturing and Processing Thin Film Products"; 2004; pp. 433-435.

(Continued)

*Primary Examiner* — Christopher E Leiby
(74) *Attorney, Agent, or Firm* — Nath, Goldberg & Meyer; Joshua B. Goldberg; Christopher Thomas

(57) ABSTRACT

The present invention provides a display substrate and a manufacturing method thereof, a touch panel comprising the display substrate, and a display device. The display substrate comprises: a first substrate; a thin film transistor, a first electrode and a second electrode formed on one side of the first substrate; and a black matrix and a color filter layer formed on the other side of the first substrate, wherein at least one of the black matrix and the color filter layer is made of conductive material, a display electric field is formed between the first electrode and the second electrode, and a touch-control electric field is formed between the first elec- (Continued)

trode and the black matrix and/or the color filter layer. The solution of the invention can improve accuracy of determination of location where touch occurs and display quality, and reduce thickness of the display substrate.

12 Claims, 3 Drawing Sheets

(51) Int. Cl.
*G02F 1/1333* (2006.01)
*G02F 1/1335* (2006.01)
(52) U.S. Cl.
CPC .... *G02F 1/133509* (2013.01); *G02F 2202/16* (2013.01); *G06F 2203/04103* (2013.01)

(56) References Cited

U.S. PATENT DOCUMENTS

| | | | | |
|---|---|---|---|---|
| 2014/0063363 | A1* | 3/2014 | Wang | G06F 3/0412 349/12 |
| 2014/0111471 | A1* | 4/2014 | Zhao | G02F 1/13338 345/174 |
| 2014/0168138 | A1* | 6/2014 | Kuo | G06F 3/0412 345/174 |
| 2014/0210774 | A1* | 7/2014 | Kim | G06F 3/0412 345/174 |
| 2014/0225131 | A1* | 8/2014 | Benson | G06F 1/1643 257/82 |
| 2014/0362029 | A1* | 12/2014 | Mo | G06F 3/044 345/174 |
| 2015/0055041 | A1* | 2/2015 | Jiang | G02F 1/1339 349/42 |

FOREIGN PATENT DOCUMENTS

| | | |
|---|---|---|
| CN | 102466907 A | 5/2012 |
| CN | 102637091 A | 8/2012 |
| CN | 102967976 A | 3/2013 |
| CN | 103364983 A | 10/2013 |
| CN | 103676358 A | 3/2014 |
| JP | 2008032756 A | 2/2008 |
| JP | 2011175002 A | 9/2011 |
| TW | 201314528 A | 4/2013 |

OTHER PUBLICATIONS

The First Office Action dated Sep. 6, 2015 corresponding to Chinese application No. 201310694084.9.
Written Opinion of the International Searching Authority dated Sep. 5, 2014 corresponding to International application No. PCT/CN2014/075660.
International Search Report dated Apr. 18, 2014 from application No. PCT/CN2014/075660.

* cited by examiner

DISPLAY SUBSTRATE AND MANUFACTURING METHOD THEREOF, TOUCH PANEL, AND DISPLAY DEVICE

This is a National Phase Application filed under 35 U.S.C. 371 as a national stage of PCT/CN2014/075660, filed Apr. 18, 2014, an application claiming the benefit of Chinese Application No. 201310694084.9, filed Dec. 17, 2013, the content of each of which is hereby incorporated by reference in its entirety.

FIELD OF THE INVENTION

The present invention relates to the technical field of touch panel, and particularly to a display substrate and a manufacturing method thereof, a touch panel, and a display device.

BACKGROUND OF THE INVENTION

Touch panel, as a new input device, is easy to use compared with conventional input means such as keyboard and mouse. With the development of touch technology, in-cell capacitive touch panel technology is most widely used nowadays. This is because the in-cell capacitive touch panel can be lighter, thinner, and has fewer processes compared to other touch panels, which can reduce cost while realizing integration of touch-control and display.

FIG. 1 is a structural diagram of an in-cell capacitive touch panel in the prior art. As shown in FIG. 1, the touch panel comprises a backlight 15, a lower glass substrate 16 formed on the backlight 15, thin film transistors 24 formed on the power glass substrate 16, pixel electrodes 19 and common electrodes 17 formed on the thin film transistors 24, an upper glass substrate 20 opposite to the lower glass substrate 16, color filter layer 22 and a black matrix 23 formed on a side (i.e., inner side) of the upper glass substrate 20 facing the lower glass substrate 16, transparent electrodes 21 formed on an outer side of the upper glass substrate 20, and liquid crystal 18 filled between the upper glass substrate 20 and the lower glass substrate 16. The common electrode 17 and the transparent electrode 21 form a touch capacitor, in which the common electrode 17 functions as a first pole of the touch capacitor and the transparent electrode 21 functions as a second pole of the touch capacitor. A touch-control electric field is formed between the first and second poles of the touch capacitor. When the display screen is touched by a finger, the touch-control electric field may be changed, and thus induced current is generated on the second pole of the touch capacitor. The location at which the touch occurs is positioned by an external touch sensing chip based on the induced current, and positioning signal is fed back to a host so that the location at which the touch occurs may be determined, contents needed to be displayed may be controlled correctly based on the location at which the touch occurs, and thereby integration of touch-control and display may be realized.

However, in the prior art, there are problems as follows. In the touch panel, in addition to the touch-control electric field between the transparent electrode and the common electrode, there is a display electric field for controlling liquid crystal display between the pixel electrode and the common electrode; since these electrodes in the touch panel of the prior art are arranged in the respective positions as shown in FIG. 1, the touch-control electric field and the display electric field may partially overlap. When a touch occurs, the touch-control electric field and the display electric field may interfere and interact with each other, which will reduce not only display quality but also accuracy of determination of location where touch occurs.

SUMMARY OF THE INVENTION

The present invention provides a display substrate and a manufacturing method thereof, a touch panel comprising the display substrate, and a display device which can improve both accuracy of determination of location where touch occurs and display quality, and reduce thickness of the display substrate.

In order to achieve the above object, the present invention provides a display substrate comprising: a first substrate; a thin film transistor, a first electrode and a second electrode formed on one side of the first substrate; and a black matrix and a color filter layer formed on the other side of the first substrate, wherein at least one of the black matrix and the color filter layer is made of conductive material, a display electric field is formed between the first electrode and the second electrode, and a touch-control electric field is formed between the first electrode and the black matrix and/or the color filter layer.

Preferably, the first electrode is a pixel electrode, and the second electrode is a common electrode.

Preferably, a light shielding layer is provided on the thin film transistor.

Preferably, the black matrix comprises a plurality of sub black matrices which are disposed with intervals therebetween.

In order to achieve the above object, the present invention provides a touch panel comprising the display substrate according to the invention and a second substrate which is disposed opposite to the display substrate.

In order to achieve the above object, the present invention provides a display device comprising the above touch panel.

In order to achieve the above object, the present invention provides a manufacturing method of a display substrate comprising:

forming a thin film transistor, a first electrode and a second electrode at one side of a first substrate, a display electric field being formed between the first electrode and the second electrode;

forming a black matrix and a color filter layer at the other side of the first substrate, at least one of the black matrix and the color filter layer being made of conductive material, and a touch-control electric field being formed between the first electrode and the black matrix and/or the color filter layer.

Preferably, the first electrode functions as a pixel electrode, and the second electrode functions as a common electrode.

Preferably, the manufacturing method of a display substrate further comprising: forming a light shielding layer on the thin film transistor.

Preferably, the black matrix comprises a plurality of sub black matrices which are disposed with intervals therebetween.

In the display substrate and the manufacturing method thereof, the touch panel comprising the display substrate and the display device according to the present invention, a thin film transistor, a first electrode and a second electrode are disposed at one side of a first substrate, and a black matrix and a color filter layer are disposed at the other side of the first substrate, wherein at least one of the black matrix and the color filter layer is made of conductive material. Thus, a display electric field formed by the first electrode and the second electrode is located at a side of the first electrode, while a touch-control electric field formed by the first electrode used as a first touch sensing end of the touch-control electric field and the black matrix and/or the color filter layer used as a second touch sensing end of the touch-control electric field is located at the other side of the first electrode. Thus, the touch-control electric field and the display electric field will not interfere with each other. In this way, influence on display by a touch is reduced, and accuracy of determination of location where touch occurs and display quality are improved. In addition, since such arrangement eliminates the need of a transparent electrode, a process for forming the transparent electrode may be eliminated and thickness of the display substrate may be reduced.

DETAILED DESCRIPTION OF THE EMBODIMENTS

In order that a skilled person in the art may fully understand the technical solutions of the invention, a display substrate and a manufacturing method thereof, a touch panel and a display device of the invention are described below in detail in conjunction with the accompanying drawings.

Figure 1:
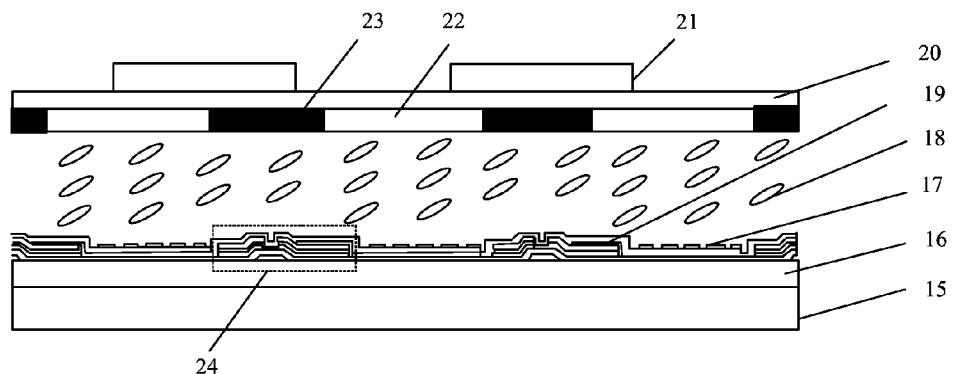
FIG. 1 is a schematic diagram of a structure of an in-cell capacitive touch panel in the prior art.
Figure 2:
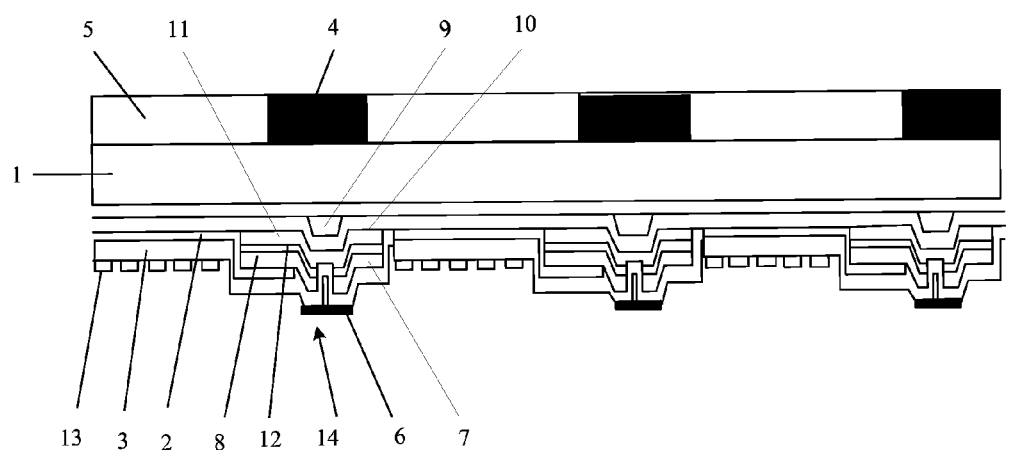
FIG. 2 is a schematic diagram of a structure of a display substrate provided by a first embodiment of the invention.

FIG. 2 is a schematic diagram of a structure of a display substrate provided by a first embodiment of the invention. As shown in FIG. 2, the display substrate comprises: a first substrate 1; a thin film transistor 14, a first electrode 2 and a second electrode 13 formed at one side of the first substrate 1; and a black matrix 4 and a color filter layer 5 formed at the other side of the first substrate 1. A display electric field is formed between the first electrode 2 and the second electrode 13. In addition, at least one of the black matrix 4 and the color filter layer 5 is made of conductive material, so that the at least one of them may function as a touch sensing end of a touch-control electric field, and thereby a touch-control electric field may be formed between the first electrode 2 and the black matrix 4 and/or color filter layer 5.

In the present embodiment, since either or both of the black matrix 4 and the color filter layer 5 is made of conductive material, a touch-control electric field may be formed between the first electrode 2 and the black matrix 4, or a touch-control electric field may be formed between the first electrode 2 and the color filter layer 5, or formed between the first electrode 2 and both of the black matrix 4 and the color filter layer 5.

It should be noted that, the display electric field in the embodiment means an electric field which is formed between a common electrode and a pixel electrode formed on the thin film transistor and is used for controlling deflection of liquid crystal molecules to perform pixel display. The touch-control electric field means an electric field which is formed between the black matrix and/or the color filter layer on the other side of the first substrate and the pixel electrode, or an electric field which is formed between the black matrix and/or the color filter layer and the common electrode. When touching the color filter layer or the black matrix, the touch-control electric field may be changed so that induced current may be generated. Based on the generated induced current, location at which the touch occurs may be determined. In the present embodiment, a case in which the first electrode is the pixel electrode and the second electrode is the common electrode is described as an example.

The thin film transistor 14 may comprise a gate electrode 9, an active layer 11, a source electrode 7 and a drain electrode 8. A gate insulation layer 10 is formed between the gate electrode 9 and the active layer 11. A protective layer 12 is formed between the active layer 11 and the source electrode 7 and drain electrode 8 by using insulation material. A passivation layer 3 is formed on the drain electrode 8. The first electrode 2 is the pixel electrode and the second electrode 13 is the common electrode. In an example, the first electrode 2 may be of plate shape, and the second electrode 13 may be of strip shape. The first electrode 2 is formed on and electrically connected to the drain electrode 8 to control a pixel to display. The second electrode 13 is formed on the protective layer 12 so as to be electrically insulated from the first electrode 2 and the drain electrode 8. A display electric field is formed between the first electrode 2 and the second electrode 13. Preferably, a light shielding layer 6 is further disposed on the thin film transistor 14. Since illumination may cause the active layer 11 in the thin film transistor 14 to change, thus influencing switching performance of the thin film transistor 14 and then influencing display, the light shielding layer 6 may be disposed to shield light emitted from a backlight so as to protect the active layer 11 in the thin film transistor 14, and thus display quality can be improved.

The black matrix 4 is configured to shield light at periphery of the pixels so as to avoid color mixing and light leakage in dark state. Preferably, material of the black matrix 4 includes opaque metal material such as Cr, Mo and so on. The black matrix 4 made of opaque metal material may realize functions of light shielding and electric conduction simultaneously. The color filter layer 5 is configured to realize display of various colors. Preferably, material of the color filter layer 5 includes conductive color resin so as to realize both functions of color display and electric conduction. In the present embodiment, both of the black matrix 4 and the color filter layer 5 are made of conductive materials so as to form touch-control sensing ends.

Figure 3:
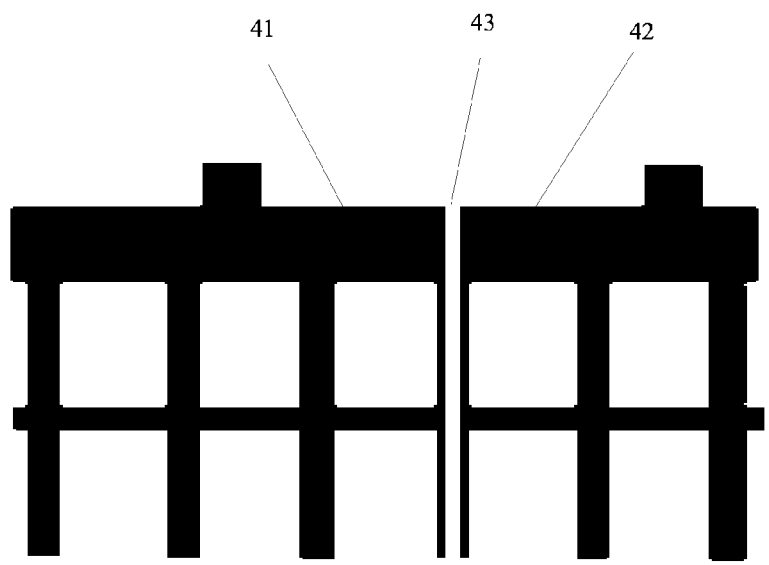
FIG. 3 is a planar schematic view illustrating a plurality of sub black matrices arranged with intervals therebetween.

Preferably, the black matrix includes a plurality of sub black matrices with intervals therebetween. FIG. 3 is a planar schematic view illustrating a plurality of sub black matrices arranged with intervals therebetween. As shown in FIG. 3, the black matrix is constructed by individual blocks having netted texture. That is, a sub black matrix 41 and a sub black matrix 42 adjacent thereto have an interval 43 therebetween, and each of the sub black matrix 41 and the sub black matrix 42 is formed to be netlike. The netted texture of the respective sub black matrices and the intervals therebetween define a plurality of block-like spaces, in each of which a color filter pattern is accommodated. Each block may have a shape of square, rectangle, diamond or other polygon. In a case that only the color filter layer is conductive, area of the touch-control electric field can be increased by providing intervals between the sub black matrices, and thereby the accuracy of determining the location where touch occurs is improved.

Figure 4:
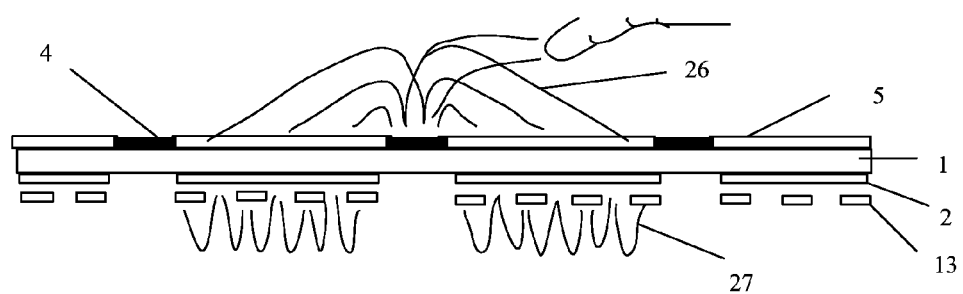
FIG. 4 is a schematic diagram illustrating partial structure of a display electric field and a touch electric field formed in a display substrate.

FIG. 4 is a schematic diagram illustrating a partial structure of a display electric field and a touch electric field formed in the display substrate. As shown in FIG. 4, the first electrode 2 and the second electrode 13 are formed on one side of the first substrate 1, while the black matrix 4 and the color filter layer 5 are formed on the other side of the first substrate 1. The first electrode 2 may function as a first touch sensing end of a touch-control electric field 26, and the black matrix 4 may function as a second touch sensing end of the touch-control electric field 26, so that the touch-control electric field 26 may be formed between the first electrode 2 and the black matrix 4. In addition, a display electric field 27 may be formed between the first electrode 2 and the second electrode 13. Thus, the first electrode 2 is a common electrode which is shared by the touch-control electric field 26 and the display electric field 27 so that the touch-control electric field 26 and the display electric field 27 are formed at both sides of the first electrode 2, respectively.

When touch surface of the display substrate is touched by a finger, the touch-control electric field 26 between the first touch sensing end and the second touch sensing end may be changed, and thereby induced current may be generated on the second touch sensing end of the touch-control electric field 26. The location at which the touch occurs is positioned by an external touch sensing chip based on the induced current, and positioning signal is fed back to a host so that the location at which the touch occurs may be determined. Optionally, the touch-control electric field 26 may be formed between the first electrode 2 and the color filter layer 5, in which the first electrode 2 functions as the first touch sensing end of the touch-control electric field 26, and the color filter layer 5 functions as the second touch sensing end of the touch-control electric field 26. Alternatively, the touch-control electric field 26 may be formed between the first electrode 2 and both of the color filter layer 5 and the black matrix 4, in which the first electrode 2 functions as the first touch sensing end of the touch-control electric field 26, and both the color filter layer 5 and the black matrix 4 function as the second touch sensing end of the touch-control electric field 26.

In the present embodiment, the first electrode which is the pixel electrode is located between the second electrode which is the common electrode and the black matrix and the color filter layer, and the first electrode is an electrode shared by the touch-control electric field and the display electric field. However, it can be understood that the locations of the first and second electrodes may not be limited. For example, in another example, the second electrode which is the common electrode may be located between the first substrate and the gate electrode. At this time, the second electrode is located between the first electrode and the black matrix/the color filter layer. Thus, the second electrode may be used as an electrode shared by the touch-control electric field and the display electric field, so that the touch-control electric field and the display electric field are formed at both sides of the second electrode, respectively. That is, a display electric field may be formed between the second electrode and the first electrode, and a touch-control electric field may be formed between the second electrode and the black matrix and/or the color filter layer. Also, the touch-control electric field and the display electric field are independent from each other, and will not interfere with each other, and the accuracy of determination of location where touch occurs and the display quality can be improved.

In the display substrate of the present embodiment, by using the black matrix or the color filter layer at one side of the first substrate as the first touch sensing end of the touch-control electric field, and using the first electrode at the other side of the first substrate as the second touch sensing end of the touch-control electric field, the touch-control electric field and the display electric field are formed at both sides of the first electrode, respectively, and will not interfere with each other. Thereby, influence on display by a touch is reduced, the accuracy of determination of location where touch occurs and the display quality are improved, and thickness of the display substrate is reduced.

Figure 5:
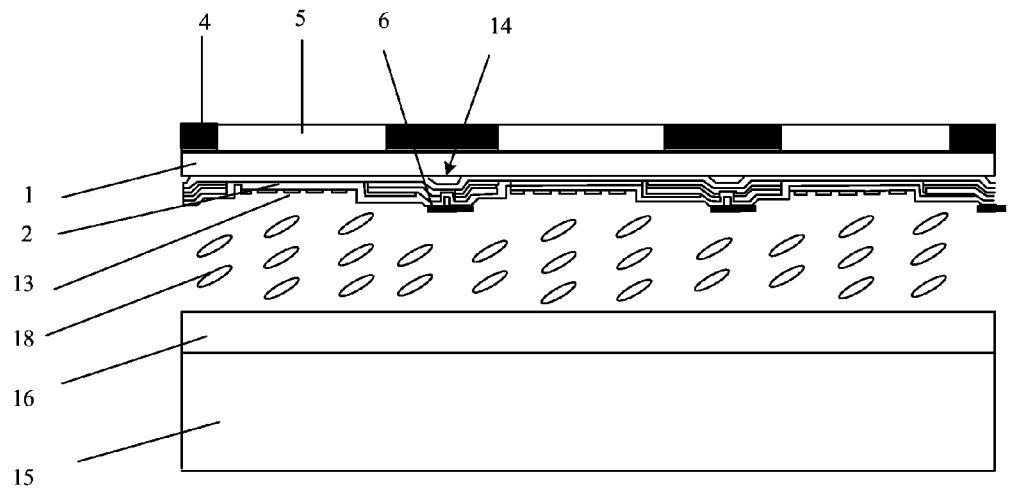
FIG. 5 is a schematic diagram of a structure of a touch panel provided by a second embodiment of the invention.

FIG. 5 is a schematic diagram of a structure of a touch panel provided by a second embodiment of the invention. As shown in FIG. 5, the touch panel comprises a display substrate and a second substrate 16 which are disposed opposite to each other, and liquid crystal 18 filled between the display substrate and the second substrate 16. The display substrate comprises: a first substrate 1; a thin film transistor 14, a first electrode 2 and a second electrode 13 formed on one side of the first substrate 1; and a black matrix 4 and a color filter layer 5 formed on the other side of the first substrate 1. A display electric field is formed between the first electrode 2 and the second electrode 13, and is used for controlling deflection of liquid crystal molecules 18 to perform display. A touch-control electric field is formed between the first electrode 2 and the black matrix 4 and/or the color filter layer 5 so as to determine location at which touch occurs. Since the touch-control electric field and the display electric field are at both sides of the second electrode 2, respectively, the two electric fields do not interfere with each other.

Preferably, a light shielding layer 6 is disposed on the thin film transistor 14. when light is emitted upwards through the second substrate 16, it will pass through a passivation layer 3 and irradiate on an active layer of the thin film transistor 14. Illumination may cause the active layer to change, thus influencing switching performance of the thin film transistor 14, and then influencing display. Since the light shielding layer 6 is provided to shield light irradiating on the thin film transistor 14, the active layer 11 of the thin film transistor 14 is protected, and display quality is improved.

The black matrix 4 is configured to shield light at periphery of the pixels so as to avoid color mixing and light leakage in dark state. Preferably, material of the black matrix 4 includes opaque metal material such as Cr, Mo and so on. The black matrix 4 made of opaque metal material may realize functions of light shielding and electric conduction simultaneously. The black matrix 4 may include a plurality of sub black matrices. The sub black matrices may be disposed with intervals therebetween. That is, gaps may exist between the sub black matrices. Thus, in a case that the black matrix 4 is not conductive while only the color filter layer 5 is conductive, the above arrangement can increase area of the touch-control electric field and improve the accuracy of touch positioning. The color filter layer 5 is configured to realize display of various colors. The color filter layer 5 may be made of conductive color resin so as to realize both functions of color display and electric conduction. In the present embodiment, both of the black matrix 4 and the color filter layer 5 are made of conductive materials so as to form touch-control sensing ends by utilizing their characteristic of electrical conduction, and thus to form the touch-control electric field.

The touch panel of the embodiment may utilize the display substrate provided by the above first embodiment.

The detailed description of the display substrate may refer to the first embodiment, and will not be repeated here.

Further, the touch panel comprises a backlight 15 which is located at a side of the second substrate 16 back against the display substrate. The backlight 15 is configured to provide light source for the touch panel. Light emitted from the backlight 15 irradiates upwards through the second substrate 16.

Preferably, the touch panel provided by the present embodiment is an in-cell capacitive touch panel.

In the touch panel provided by the present embodiment, by using the black matrix and/or the color filter layer formed on one side of the first substrate in the display substrate as the first touch sensing end of the touch-control electric field, and using the first electrode formed on the other side of the first substrate as the second touch sensing end of the touch-control electric field, a touch-control electric field is formed between the first electrode and the black matrix and/or the color filter layer while a display electric field is formed between the first electrode and the second electrode which are located at the same side of the first substrate. In this way, the two electric fields are at both sides of the first electrode, respectively, and thus will not interfere with each other. Thereby, influence on display by a touch is reduced, accuracy of determination of location where touch occurs and the display quality are improved, and thickness of the display substrate is reduced.

A third embodiment of the present invention provides a display device which comprises a touch panel. The touch panel may be the one provided by the above second embodiment, and is not repeated here.

In the present embodiment, the display device may be any product or component that has display function, such as mobile telephone, tablet computer, television, display, notebook computer, digital album, navigator, or the like.

In the display device provided by the present embodiment, by using the black matrix and/or the color filter layer formed on one side of the first substrate in the display substrate as the first touch sensing end of the touch-control electric field, and using the first electrode formed on the other side of the first substrate as the second touch sensing end of the touch-control electric field, a touch-control electric field is formed between the first electrode and the black matrix and/or the color filter layer while a display electric field is formed between the first electrode and the second electrode which are located at the same side of the first substrate. In this way, the two electric fields are at both sides of the first electrode, respectively, and thus will not interfere with each other. Thereby, influence on display by a touch is reduced, accuracy of determination of location where touch occurs and the display quality are improved, and thickness of the display substrate is reduced.

Figure 6:
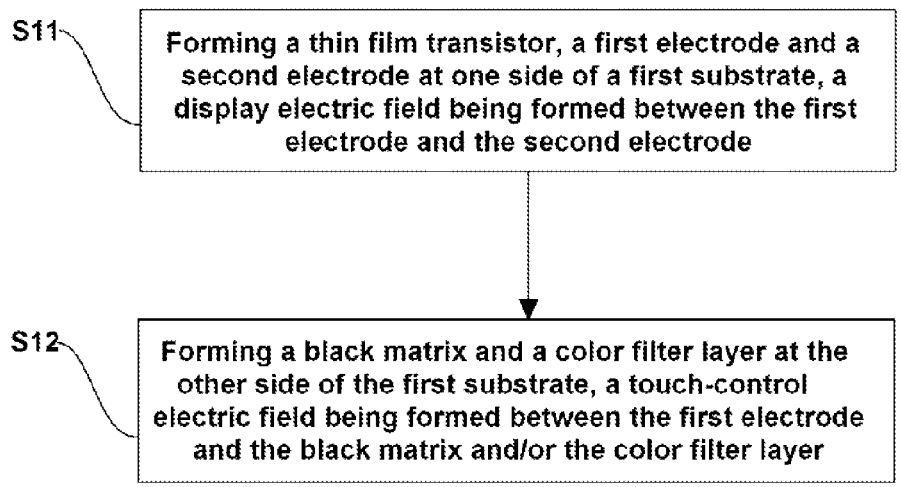
FIG. 6 is a flow chart of a manufacturing method of a display substrate provided by a fourth embodiment of the invention.

FIG. 6 is a flow chart of a manufacturing method of a display substrate provided by a fourth embodiment of the invention. As shown in FIG. 6, the manufacturing method of a display substrate comprises steps S11 and S12.

At step S11, a thin film transistor, a first electrode and a second electrode are formed at one side of a first substrate, and a display electric field is formed between the first electrode and the second electrode.

Specifically, a first substrate is provided at first. Then, a thin film transistor comprising a gate electrode, a gate insulation layer, an active layer, a protective layer, a source electrode, a drain electrode and a passivation layer is formed on the first substrate by patterning process. After forming the drain electrode, a layer of transparent conductive thin film is deposited over the drain electrode, and a first electrode which is electrically connected to the drain electrode is formed by patterning process. After forming the passivation layer, a layer of transparent conductive thin film is deposited, and a second electrode is formed by patterning process. A display electric field is formed between the first electrode and the second electrode. The patterning process comprises at least processes such as photoresist application, masking with a mask, exposure, developing, etching, photoresist stripping, and so on. Optionally, after forming the thin film transistor, the first electrode and the second electrode at one side of the first substrate, the method further comprises forming a light shielding layer on the thin film transistor. The light shielding layer is used for shielding light emitted from the backlight so as to protect the active layer of the thin film transistor, and thus display quality is improved.

At step S12, a black matrix and a color filter layer are formed at the other side of the first substrate, and a touch-control electric field is formed between the first electrode and the black matrix and/or the color filter layer.

Specifically, the first substrate subjected to the step S11 is overturned by a soft transportation manipulator. Red filter patterns, green filter patterns and blue filter patterns are formed successively by patterning process so as to form a color filter layer comprising these filter patterns. Black light shielding material is then deposited on the substrate with the color filter layer formed thereon, and a black matrix is formed by patterning process. The patterning process comprises at least processes such as photoresist application, masking with a mask, exposure, developing, etching, photoresist stripping, and so on. Naturally, the black matrix may be formed before forming the color filter layer. The black matrix 4 is used for shielding light at periphery of the pixels so as to avoid color mixing and light leakage in dark state. Preferably, material of the black matrix 4 includes opaque metal material such as Cr, Mo and so on. The black matrix 4 made of opaque metal material may realize functions of light shielding and electric conduction simultaneously. The color filter layer 5 is configured to realize display of various colors. Material of the color filter layer 5 includes conductive color resin. The color filter layer 5 made of conductive color resin may realize both functions of color display and electric conduction. In the present embodiment, both of the black matrix and the color filter layer are made of conductive materials so as to form touch-control sensing ends by utilizing their characteristic of electrical conduction, and thus to form electric field.

According to the manufacturing method of a display substrate provided by the present embodiment, a thin film transistor, a first electrode and a second electrode are formed at one side of a first substrate, wherein a display electric field is formed between the first electrode and the second electrode; and then, a black matrix and a color filter layer are formed at the other side of the first substrate, wherein a touch-control electric field is formed between the first electrode and the black matrix and/or the color filter layer. In this way, the touch-control electric field and the display electric field are formed at both sides of the first electrode, respectively, and thus will not interfere with each other. Thereby, influence on display by a touch is reduced, accuracy of determination of location where touch occurs and the display quality are improved, and thickness of the display substrate is reduced.

It should be noted that, the thin film transistor in the invention is described by taking a bottom-gate type thin film transistor (i.e., the gate electrode is located under the active layer pattern) as an example, which is only an example and should not be interpreted as limitation of the scope of the invention. In practice, structure of the thin film transistor may be modified as required. For example, the thin film transistor in the invention may be a top-gate type thin film transistor (i.e., the gate electrode is located above the active layer pattern).

It can be understood that the above embodiments are only exemplary embodiments for illustrating the principle of the present invention; however, the present invention is not limited thereto. As for a person skilled in the art, various variations and improvements can be made without departing from the spirit and essence of the present invention, and these variations and improvements should be considered to be fallen within the protection scope of the present invention.

The invention claimed is:

1. A display substrate, characterized by comprising:
a first substrate comprising a first side and a second side opposite to the first side;
a thin film transistor disposed directly on the first side of the first substrate;
a first electrode disposed directly on the thin film transistor;
a second electrode disposed on the first electrode; and
a black matrix and a color filter layer disposed in a same layer on the second side of the first substrate,
wherein at least one of the black matrix and the color filter layer is made of conductive material, a display electric field is formed between the first electrode and the second electrode, and a touch-control electric field is formed between the first electrode and the black matrix and/or the color filter layer.

2. The display substrate of claim 1, wherein the first electrode is a pixel electrode, and the second electrode is a common electrode.

3. The display substrate of claim 1, wherein a light shielding layer is disposed on a side of the thin film transistor away from the first substrate.

4. The display substrate of claim 1, wherein the black matrix comprises a plurality of sub black matrices which are disposed with intervals there between.

5. A display device, characterized by comprising a touch panel, the touch panel comprising the display substrate of claim 1, a second substrate which is disposed opposite to the display substrate, and a liquid crystal layer disposed between the display substrate and the second substrate,
wherein the first side of the first substrate in the display substrate faces the liquid crystal layer.

6. The display device of claim 5, wherein the first electrode is a pixel electrode, and the second electrode is a common electrode.

7. The display device of claim 5, wherein a light shielding layer is disposed on the thin film transistor.

8. The display device of claim 5, wherein the black matrix comprises a plurality of sub black matrices which are disposed with intervals there between.

9. A manufacturing method of a display substrate, characterized by comprising:
forming a thin film transistor directly on a first side of a first substrate;
forming a first electrode directly on the thin film transistor;
forming a second electrode on the first electrode, a display electric field being formed between the first electrode and the second electrode; and
forming a black matrix and a color filter layer in a same layer on the second side of the first substrate, at least one of the black matrix and the color filter layer being made of a conductive material, and a touch-control electric field being formed between the first electrode and the black matrix and/or the color filter layer.

10. The manufacturing method of a display substrate of claim 9, wherein the first electrode functions as a pixel electrode, and the second electrode functions as a common electrode.

11. The manufacturing method of display substrate of claim 9, further comprising forming a light shielding layer on the thin film transistor.

12. The manufacturing method of display substrate of claim 9, wherein the black matrix comprises a plurality of sub black matrices which are disposed with intervals there between.

* * * * *